March 10, 1942.   C. D. MAGNESEN   2,276,221
BEARING SEAL
Filed April 17, 1940
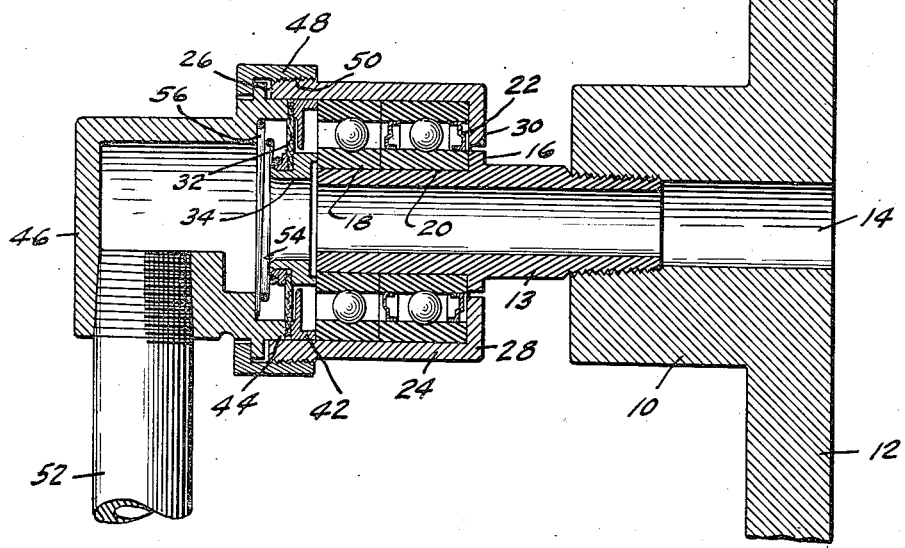
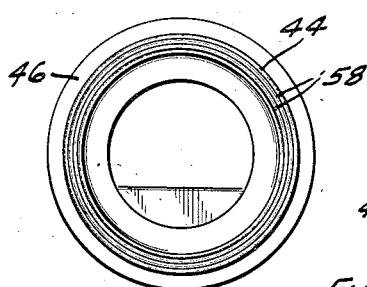
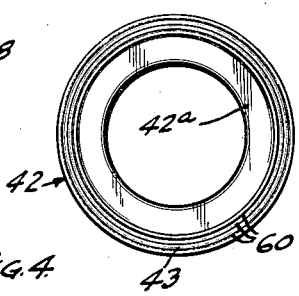
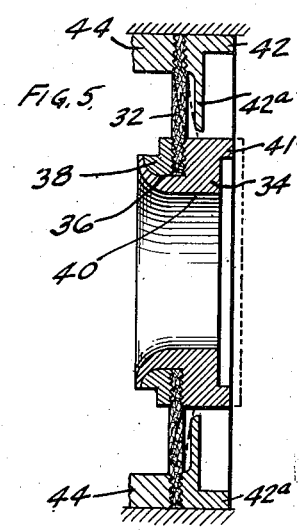
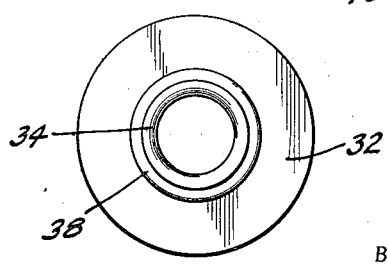
INVENTOR.
CHARLES D. MAGNESEN
BY Harry H. Hitzeman
ATTORNEY.

Patented Mar. 10, 1942

2,276,221

UNITED STATES PATENT OFFICE 2,276,221

BEARING SEAL

Charles D. Magnesen, Chicago, Ill.

Application April 17, 1940, Serial No. 330,190

4 Claims. (Cl. 285—97.1)

My invention relates to improvements in bearing seals and like devices.

My invention relates more particularly to improvements in a sealing device for bearings of the type used in drying, heating or cooling cylinders wherein a hollow shaft is employed and a heating or cooling medium may be introduced into the cylinder or roll through a sealed joint associated with one end of the shaft.

The principal object of my invention is to provide an improved bearing seal for the purpose described that is absolutely leak-proof under normal operating conditions, one which requires no adjustment during operation and in which the friction is reduced to a minimum.

A further object of my invention is to provide an improved bearing seal of this type that is easily and simply constructed and assembled and will not become broken or out of order through long or rough usage.

The flexible diaphragm in seals of this type on the market today is frequently blown out or torn due to excessive and sudden pressure changes.

A further object of my invention is to provide a construction of bearing seal wherein a supporting member is provided for the diaphragm between its fixed periphery and the sealing nose attached thereto so that it is impossible to blow out the gaskets by excessive or sudden pressure changes.

A further object of my invention is to provide an improved construction of bearing seal and the method in which the flexible diaphragm is held about its periphery to prevent pulling out of the edge of the diaphragm.

A further object of the invention is to provide in conjunction with the above construction an improved manner of fastening the bearing nose to the edge of the opening in the diaphragm in such a way that the bearing nose can not be separated from the diaphragm without destroying one or the other.

Other objects and advantages will be more apparent from the following description wherein reference is had to the accompanying sheet of drawing upon which Fig. 1 is a vertical sectional view through my improved bearing seal and associated parts, the same being shown attached to a rotatable cylinder or similar member;

Fig. 2 is a front elevational view of the fluid inlet casing showing the ridges for holding the sealing diaphragm about its edges;

Fig. 3 is a similar view of the spacer member located on the opposite side of the diaphragm showing the same type of ridges for the same purpose;

Fig. 4 is a front elevational view of the diaphragm and bearing nose assembly;

Fig. 5 is an enlarged fragmentary cross sectional view of a portion of Fig. 1, showing the diaphragm and associated parts, and in dotted lines, the manner in which the same may be flexed and supported by the member provided for that purpose.

In the embodiment of the invention which has been chosen for illustration, in Fig. 1 I have shown the bearing seal assembly attached to a boss 10 of the wall 12 of a hollow cylinder or similar device. I provide the hollow shaft 13 screw-threadedly connected thereto and aligned with the opening 14 leading to the interior of the cylinder. The shaft 13 may be provided with an annular shoulder portion 16 and have a pair of ball-bearing members 18 and 20 positioned upon one end of the same against the shoulder 16. One of the ball-bearing members may be provided with the oil seal 22 of the usual type. The bearing members 18 and 20 may be mounted in a housing 24 provided with the open end 26 and a vertical wall 28 through which an opening 30 is provided for the extension of the shaft 13.

The bearing seal which I provide may generally comprise the flexible diaphragm 32 having a bearing nose member 34 attached to the diaphragm and positioned axially thereof. The bearing nose member may be formed with a reduced shoulder portion 36 to receive a lock ring 38 and the same may be assembled together by rolling or peaning over the reduced portion of the bearing nose. An axial opening 40 is provided through the same and an annular ledge portion 41 which is adapted in use to frictionally bear against the inner race of the ball-bearing member 18. The diaphragm may be held at its peripheral edge between a spacer member 42 and an annular ridge 44 on the end of the inlet chamber 46. The inlet chamber diaphragm and bearing housing are all secured together by means of a cap member 48 which screw-threadedly engages the threaded end 50 of the bearing housing 24. An inlet pipe 52, through which water, steam or other fluid may be introduced, is connected to the inlet chamber 46 in a usual manner.

In its normal operation, the diaphragm 32 and the annular ridge 41 of the bearing nose 34 are frictionally held against the ring of the bearing 18 by a coiled spring member 54 positioned against a wall 56 in the inlet housing. As shown in Figs. 2, 3 and 5, I have provided a plurality of circular grooves and projections 58 in the face of the annular ridge 44. I have provided a similar series of circular grooves and projections 60 on the face of the ridge 43 of the support member 42. Thus when the diaphragm is positioned in the housing in the manner shown, it will be impossible to pull the edges of the diaphragm out of its fastening and it will also be impossible to pull the bearing nose member and diaphragm apart.

While the diaphragm may be one of the usual types of flexible metal diaphragms, I prefer to make the same of a rubber composition or a synthetic material such as neophrene or other suitable material, depending upon the purpose for which the sealing joint is required.

As previously stated herein, flexible diaphragms of this type are frequently subject to surges or undue pressures which bear against the flexible portion of the same between the bearing nose member and the outer fastening. When these pressures occur, the diaphragm is frequently burst between these two fastenings, and thus it is necessary to stop the machine upon which the same is used for disassembly or replacement. In addition, damage is caused to the bearings or other elements and this is a very undesirable feature of the seals of this type at present on the market. In order to prevent such action, I have provided on the spacer member 42, an inwardly turned annular ledge 42a which has a circular opening through it of a larger diameter than the bearing nose so that the same may extend through the ledge. Thus, when the bearing nose member is pressed forward against the inner race of the ball bearing, by the pressure of fluid passing through, the diaphragm is flexed to the position shown in dotted lines in Fig. 5. An undue surge of pressure, instead of bursting the diaphragm, would cause the wall of the same to flatten against the ledge 42a and thus effectively prevent bursting or tearing of the diaphragm.

The annular ridge 41 of the sealing nose member may be of a suitable wearing material which has its face finished perfectly flat and smooth, and in operation it is adapted to frictionally engage against the revolving inner race of the ball-bearing which is also finished flat and smooth so that the radial sealing joint is leak-proof. The ridge of the sealing nose assembly may of course run against the end of a shaft or against a separate ring attached to the shaft if desired with but small change in construction. The spring member with its smaller coil thrusting against the back of the sealing nose assembly, and its outer coil against a ledge in the inlet member, keeps the annular ridge of the sealing nose and the revolving seat together frictionally at all times, regardless of vibration and play or expansion in the shaft, thereby maintaining a leak-proof sealed joint at all times without adjustments or maintenance requirements of any kind. The ball bearing members are preferably provided with grease or other lubricant which is held between the spacer 42 and the sealing nose member 34, so that the lubricant cannot enter the hollow shaft or comingle with the medium passing therethrough.

From the above description it will be apparent to those skilled in the art that I have provided a highly improved type of bearing seal for use with cylinders into which it is desired to direct either a heating, drying or cooling medium under pressure. By the use of the spacer 42 and its associated ledge 42a, I have provided a construction which will effectively prevent leakage at the joint due to the bursting of the diaphragm under undue or unusual pressures or surges of pressure.

While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

1. Apparatus of the class described comprising a rotatable hollow shaft, a bearing therefor, said bearing mounted on one end of said shaft, a housing member having an axial opening, the shaft positioned in said housing with one end projecting from said opening, a spacer in said housing adjacent said bearing, a casing having an inlet chamber connected to said housing and a flexible sealing member fastened between a wall of said casing and the spacer in said housing, said sealing member having a nose portion and an opening aligned with said shaft opening, said nose portion having an annular ridge adapted to bear against said shaft bearing encircling the opening in said shaft, spring means in said inlet housing for holding said nose against said bearing, and an annular backing plate for said flexible sealing member spaced therefrom.

2. Apparatus of the class described comprising a rotatable hollow shaft, a bearing therefor, said bearing mounted on one end of said shaft, a housing member having an axial opening, the shaft positioned in said housing with one end projecting from said opening, a spacer in said housing adjacent said bearing, a casing having an inlet chamber connected to said housing and a flexible sealing member fastened between a wall of said casing and the spacer in said housing, said sealing member having a nose portion and an opening aligned with said shaft opening, said nose portion having an annular ridge adapted to bear against said shaft bearing encircling the opening in said shaft, spring means in said inlet housing for holding said nose against said bearing, and an annular backing plate for said flexible sealing member spaced therefrom, said backing plate formed integrally with said spacer and having the bearing nose telescoped therethrough.

3. A bearing seal for maintaining a leak-proof connection between a stationary pipe and a revolving hollow cylinder, including a housing to which said pipe is connected, a hollow shaft connected to said cylinder, a bearing in said housing for said shaft, a spring backed diaphragm positioned in said housing at the end of said shaft, a bearing nose secured to said diaphragm with an annular ledge positioned against the end of said shaft bearing, said diaphragm secured about its periphery in said housing and having a supporting wall spaced therefrom extending to a point adjacent said bearing nose.

4. Apparatus of the class described comprising a rotatable hollow shaft, a housing member having an axial opening into which said shaft extends, a bearing in said housing, said shaft positioned in said bearing and extending through said opening, a casing having an inlet chamber connected to said housing and a flexible sealing member fastened between the forward wall of said casing and a spacer aligned with said wall and positioned against the end of said bearing, said sealing member having a bearing nose portion with an opening aligned with said shaft opening, said bearing nose having an annular ridge surrounding the opening therein and adapted to bear against said shaft bearing encircling the opening in said shaft, spring means in said inlet housing for holding the ridge on said bearing nose against said bearing, and a backing plate for said sealing member formed integral with said spacer and spaced from said sealing member with an opening therethrough through which said bearing nose is axially movable.

CHARLES D. MAGNESEN.